United States Patent
Lupper et al.

(10) Patent No.: US 7,522,907 B2
(45) Date of Patent: Apr. 21, 2009

(54) GENERIC WLAN ARCHITECTURE

(75) Inventors: Alfred Lupper, Aystetten (DE);
Hans-Jochen Morper, Erdweg (DE);
Maximilian Riegel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 12 days.

(21) Appl. No.: 10/363,320

(22) PCT Filed: Aug. 30, 2001

(86) PCT No.: PCT/DE01/03331

§ 371 (c)(1),
(2), (4) Date: Mar. 3, 2003

(87) PCT Pub. No.: WO02/19617

PCT Pub. Date: Mar. 7, 2002

(65) Prior Publication Data

US 2003/0171112 A1    Sep. 11, 2003

(30) Foreign Application Priority Data

Sep. 1, 2000  (DE) ............................. 100 43 203

(51) Int. Cl.
*H04M 1/66*    (2006.01)
(52) U.S. Cl. ............. 455/411; 455/408; 455/432.1; 455/445; 455/558; 455/41.2; 370/338; 370/328; 370/401; 370/352
(58) Field of Classification Search ............. 455/433, 455/432.1, 410–411, 426.1, 445, 435.1, 41.2, 455/414.1, 558, 405–408; 370/401, 338, 370/328, 352; 380/247; 713/201; 709/230; 379/93.02
See application file for complete search history.

(56) References Cited

U.S. PATENT DOCUMENTS

| 5,670,950 | A  | * | 9/1997  | Otsuka ........................ 455/411 |
| 5,884,168 | A  | * | 3/1999  | Kolev et al. .............. 455/432.1 |
| 6,038,439 | A  | * | 3/2000  | Rune .......................... 455/406 |
| 6,091,945 | A  | * | 7/2000  | Oka ........................... 455/411 |
| 6,112,078 | A  | * | 8/2000  | Sormunen et al. ........... 455/411 |
| 6,151,495 | A  | * | 11/2000 | Rune ....................... 455/426.1 |
| 6,243,581 | B1 | * | 6/2001  | Jawanda .................. 455/432.2 |
| 6,292,657 | B1 | * | 9/2001  | Laursen et al. ............. 455/411 |
| 6,366,561 | B1 | * | 4/2002  | Bender ....................... 370/238 |
| 6,430,407 | B1 | * | 8/2002  | Turtiainen .................. 455/411 |

(Continued)

FOREIGN PATENT DOCUMENTS

EP    0 766 427 A2    4/1997

(Continued)

*Primary Examiner*—Sharad Rampuria
(74) *Attorney, Agent, or Firm*—Staas & Halsey LLP

(57) ABSTRACT

A first network is structured according to a first technology, especially a data network, comprising one or several network devices and/or interfaces, which are configured to establish communication with at least one station using the first technology and have basic functions for autonomous operation of the first network. In order to be able to collect subscriber-related data from a data source outside the network, especially a second network structured according to a second technology, more particularly a cellular mobile telephone network, when a subscriber who is not registered in the first network is connected, one of the two networks generically enables logical functions of components of the other network. A network facility enables the implementation of the above-mentioned method.

33 Claims, 5 Drawing Sheets

U.S. PATENT DOCUMENTS

| | | | |
|---|---|---|---|
| 6,452,925 B1 * | 9/2002 | Sistanizadeh et al. | 370/352 |
| 6,463,474 B1 * | 10/2002 | Fuh et al. | 709/225 |
| 6,477,644 B1 * | 11/2002 | Turunen | 713/161 |
| 6,704,789 B1 * | 3/2004 | Ala-Laurila et al. | 709/230 |
| 6,795,701 B1 * | 9/2004 | Baker et al. | 455/411 |
| 6,829,473 B2 * | 12/2004 | Raman et al. | 455/406 |
| 6,957,067 B1 * | 10/2005 | Iyer et al. | 455/435.1 |
| 6,980,801 B1 * | 12/2005 | Soininen et al. | 455/435.1 |
| 7,031,707 B1 * | 4/2006 | Rune et al. | 455/433 |
| 7,096,014 B2 * | 8/2006 | Haverinen et al. | 455/432.1 |
| 7,107,620 B2 * | 9/2006 | Haverinen et al. | 726/29 |
| 7,231,521 B2 * | 6/2007 | Buddhikot et al. | 713/171 |
| 7,254,119 B2 * | 8/2007 | Jiang et al. | 370/328 |
| 7,292,592 B2 * | 11/2007 | Rune | 370/401 |
| 7,343,158 B2 * | 3/2008 | Mizell et al. | 455/435.1 |
| 2002/0034298 A1 * | 3/2002 | Gallagher et al. | 380/247 |
| 2002/0037708 A1 * | 3/2002 | McCann et al. | 455/411 |
| 2002/0085516 A1 * | 7/2002 | Bridgelall | 370/329 |
| 2002/0160748 A1 * | 10/2002 | Rahman et al. | 455/406 |
| 2003/0214958 A1 * | 11/2003 | Madour et al. | 370/401 |
| 2004/0017800 A1 * | 1/2004 | Lupper et al. | 370/352 |

FOREIGN PATENT DOCUMENTS

| | | |
|---|---|---|
| EP | 0 999 672 A2 | 5/2000 |
| EP | 999672 A2 * | 5/2000 |
| WO | WO 96/34504 | 10/1996 |
| WO | WO 99/20071 | 4/1999 |
| WO | WO 00/67446 | 11/2000 |
| WO | WO 0067446 A1 * | 11/2000 |
| WO | WO0067446 A1 * | 11/2000 |

* cited by examiner

GENERIC WLAN ARCHITECTURE

CROSS REFERENCE TO RELATED APPLICATIONS

This application is based on and hereby claims priority to PCT Application No. PCT/DE01/03331 filed on 30 Aug. 2001 and German Application No. 100 43 203.4 filed on 1 Sep. 2000, the contents of which are hereby incorporated by reference.

BACKGROUND OF THE INVENTION

In line based communication systems, communication takes place between subscriber stations connected to one another by wires, with switching centers generally being interposed between these subscriber stations.

In radio communication systems, for example in the second generation European mobile radio system GSM (Global System for Mobile Communications), information such as speech, image information or other data is transmitted via a radio interface using electromagnetic waves. The radio interface refers to a connection between a base station and a large number of subscriber stations, the subscriber stations being able to be mobile stations or fixed radio stations, for example. In this case, the electromagnetic waves are radiated at carrier frequencies which are in a frequency band provided for the respective system. For future radio communication systems, for example the UMTS (Universal Mobile Telecommunication System) or other 3rd generation systems, frequencies in a frequency band around approximately 2000 MHz are provided. For the third mobile radio generation UMTS, two modes are provided, one mode denoting FDD (Frequency Division Duplex) operation and the other mode denoting TDD (Time Division Duplex) operation. These modes are used in different frequency bands, with both modes supporting a code division "CDMA" (Code Division Multiple Access) subscriber separation method.

For data access, particularly in line based systems, connections between a subscriber station and an access network are normally controlled using a point-to-point protocol (PPP). When setting up a connection, the subscriber or the subscriber station setting up the connection is authenticated, which, inter alia, can be the basis for central billing of charges incurred. For the purposes of authentication, the RADIUS (Remote Authentication Dial In User Service) protocol is known.

If such communication systems provide the subscriber stations, e.g. a computer or host, with network access for data transmission, e.g. for Internet services, then installation of a subscriber station involves configuration, where all settings, particularly IP (Internet Protocol) addresses, required for data access are stored in the subscriber station. These allow the subscriber station, or the subscriber, to contact supporting services which are absolutely necessary for the operating sequence of the desired data service, e.g. Internet access, and also network components on which these services run. These addresses include not only the IP address of an HTTP server which allows an Internet page to be called up conveniently "by mouse click", for example, but also, inter alia, the address of a DNS (Domain Name Server), which ascertains the IP address associated with a subscriber, and also the address of an SMTP (Simple Mail Transfer Protocol) server, which is necessary for transmitting electronic messages, known as e-mail.

Besides the communication systems listed above, there are data networks which generally have a local structure and are designed for universally connecting data stations, unreservedly referred to as hosts below merely in order to distinguish them from the subscriber stations referred to above. Two host computers can be connected to one another directly or via hubs and bridges and to network devices, such as an access server. Data packets are transported between a host and another network device normally by the IP (Internet Protocol).

When connecting a host to a network, for example a local area data network (LAN), a connection or access server uses, by way of example, the "dynamic host configuration protocol" (DHCP) to allocate the host an IP address at which the host can clearly be identified and addressed in the network. In addition, the host is in this case notified of addresses for auxiliary services of importance to it and for network components on which these services are executed in this network.

A host is normally connected to a local area network by wires, with the last part of wire based access in relatively new networks being able to be effected wirelessly by radio. A local area network which supports wireless connection of hosts is referred to universally as a W-LAN (Wireless Local Area Network).

When a connection is set up, the host setting up the connection is authenticated and authorized, if at all, on an authentication and authorization server which can optionally also permit central billing of charges incurred (AAA server).

The communication systems and networks described above thus differ in terms of a large number of features, which means that it is currently not possible to connect stations in one system to those in another system directly.

Upon installation for IP access, a subscriber station in a telecommunication system needs to be notified, by software installation, of the IP addresses required for connection setup in advance before initial connection or connection setup to a corresponding network interface. By contrast, in a local area data network, all IP addresses required are automatically assigned directly whenever a host reconnects to a data network. A subscriber station and a host are thus not devices which are compatible with the other network technology.

Another example of incompatibility can be seen in the type of connection setup, for example. On the one hand, a point-to-point connection protocol (PPP) is used between subscriber stations and the network-end data terminals, known as RASs (Remote Access Server), in the telecommunication systems, the point-to-point protocol being used between the actual, network specific transport protocol layers and the IP for the purpose of connection control. On the other hand, in local area networks, known as LANs, inter alia, this additional connection control is not necessary, however, which means that data packets, "IP packets", can be transmitted directly on the underlying transport layer. The transport layer is advantageously provided by an Ethernet.

Particularly in a radio telecommunication system, the system's visitor location register (VLR) and the subscriber home location register (HLR) additionally always need to be informed about the current location of an active subscriber and of his service access entitlements. Otherwise, it would not be possible to start setting up a connection to this subscriber from another subscriber station. In contrast to this, comparable functions of a visitor location register do not need to be available, or need to be available only to a limited extent, in a local area data network, since the network clients are pure retrieval services sending a triplet to the network, for example. A triplet comprises two challenge values and a value for an expected response (response value).

Each of the communication technologies has its own specific advantages and drawbacks. By way of example, wired access by a station to the corresponding telecommunication system is fast but fixed, i.e. tied to one location, although point-to-point access is connection oriented, it is not freely configurable, cellular access (radio telecommunication system) is largely mobile but is limited in terms of transmission bandwidth, access to a local area network (LAN) is self-configurable or auto-configurable but unsafe, since there is generally no authentication.

In different technologies, there are approaches or considerations regarding integration of other technologies' advantages into the technology in question:

in the case of IETF (Internet Engineering Task Force), extensions to existing protocols and/or new protocols are planned, in the case of UMTS, provision needs to be made for the transmission of speech (voice) and various data services, in the case of GSM, a special packet data service (GPRS: General Packet Radio Service) is being introduced, ...

In this case, however, aspects of other technologies are disadvantageously always integrated by a specific and complex extension of the technology in question.

The currently available data network technologies allow a subscriber to use a notebook having a radio data network card, e.g. at an airport, to register in a foreign data network which can be accessed there using a radio interface. This is possible because open-plan data networks do not involve any authorization check being performed. However, the network operator can prevent the foreign subscriber from accessing particular files or programs in the data network only if he uses a high level of programming complexity.

In this case, the programming needs to be done in various devices in the data network and in the various hosts which are to be protected from foreign access. Only a limited amount of protection is possible, particularly when the host or the subscriber has knowledge of network-internal IP addresses.

EP 0766427 A2 describes an office communication system in which data are interchanged between a local area network (LAN) and a GSM network. To this end, the local area network has an interface (gateway computer) which converts the local area network's data into a data format for the GSM network, and vice versa.

SUMMARY OF THE INVENTION

One possible object of the invention is to make the various systems, particularly a telecommunication system and a local area data network, compatible with one another such that it is possible for a station in a first system to access stations in a second system with a minimal amount of structural and/or programming complexity.

Such a design allows stations in one system to communicate with stations in the other system with only a minimal level of structural and/or programming complexity. The various technologies can be combined such that their respective advantageous properties can be utilized by devices in other technologies. In particular, by way of example, authentication and authorization functions from a cellular radio telecommunication network can be made available to a data network, so that, by way of example, it becomes possible to authenticate and authorize a subscriber who is foreign to the data network.

In particular, necessary adjustments can be made in system or network stations, so that no alterations need to be made to the end stations, that is to say to the subscriber stations or hosts, which are the bulk goods in a communication or data network.

Ideally, a generic overall architecture is obtained which affords the best range of advantages from a wide variety of technologies. This therefore does not just involve simple further development of a single technology, but rather a unique overall concept which can be extended without difficulty. By way of example, the overall architecture can have the advantages that it affords simple, easy access and autoconfigurability for a local area data network (LAN), that it combines and uses PP-protocol and DHC-protocol access philosophies, that it allows the most suitable mobility functionality for mobile data access, that it affords broadband data access to services having high demands (best effort services), that it ensures a high level of security, that it allows a service provider's claimed services to be calculated and billed for (billing and accounting), that it provides an organization and maintenance center in the data network, that it affords connection to cellular networks, particularly radio telecommunication systems, that it can be implemented very inexpensively, that it supports all conceivable host platforms (PC/Laptop/Palm®Top/Windows®/Linux®/OS2®/ MAC OS®, ... ) with a minimal amount of programming complexity not specific to platform, that it provides for standardized transport and access technologies.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
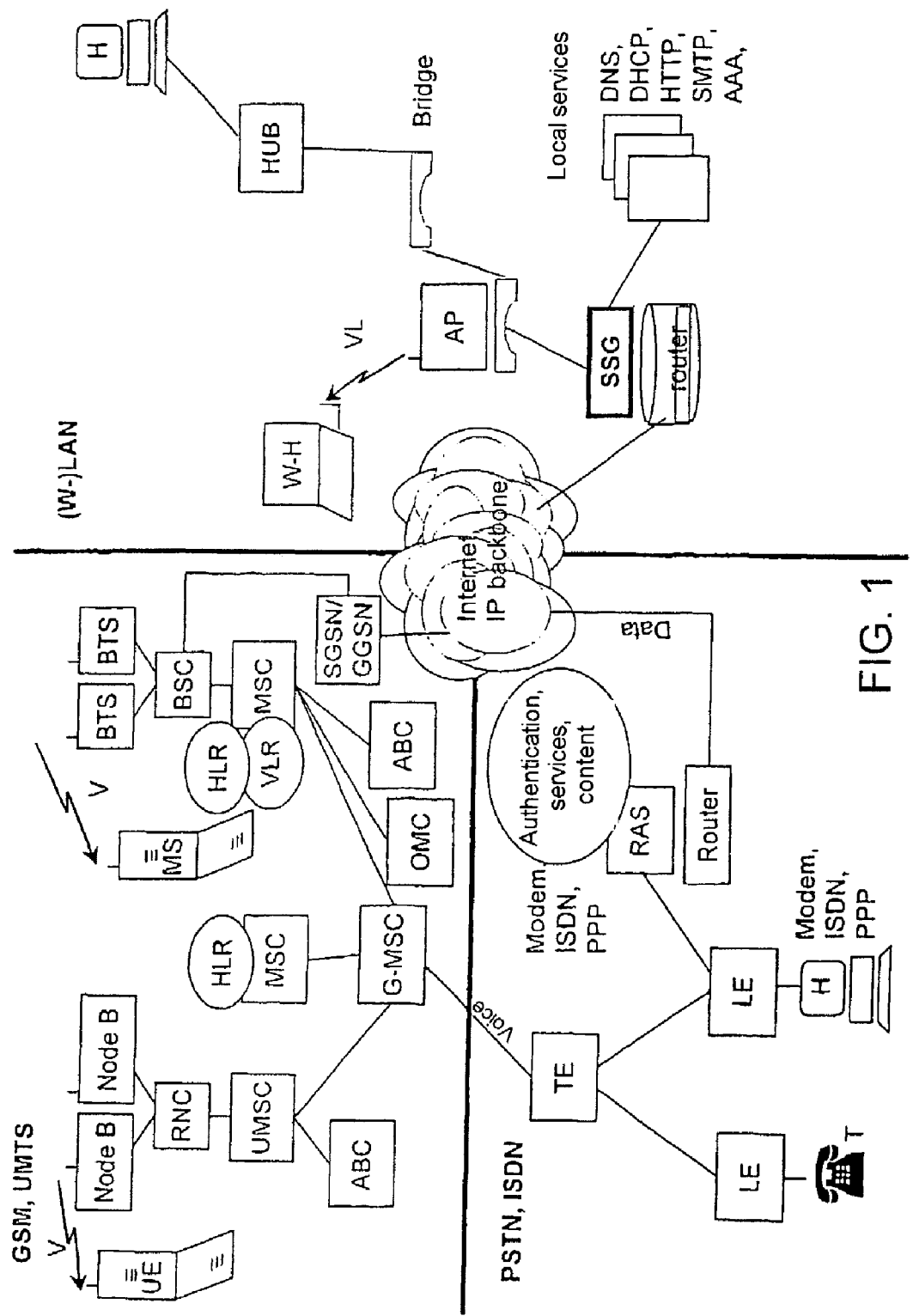
FIG. 1 shows a known wired telecommunication system in the bottom left half of the picture, a radio telecommunication system in the top left half of the picture, and a local area data network in the right half.

Reference will now be made in detail to the preferred embodiments of the present invention, examples of which are illustrated in the accompanying drawings, wherein like reference numerals refer to like elements throughout.

As can be seen from the bottom left of FIG. 1, a telecommunication system or network preferably has wired subscriber devices, for example telephones T and computers connected by a modem device, or hosts H. The telecommunication system can be, by way of example, an integrated services digital communication network ISDN (Integrated Services Digital Network), a known public telephone network PSTN (Public Switched Telephone Network) or a digital xDSL system (DSL: Digital Subscriber Line).

Local exchanges LE to which the individual subscriber installations T or H are connected can be connected to one another and to further network devices, e.g. to a transit exchange TE, which are used for linking to or communicating with other networks.

Particularly for connecting hosts to a data network via a transport network (ISDN), the telecommunication system PSTN/ISDN has a server for remote data access, which is referred to below as a remote access server RAS. The remote access server RAS is necessary in the current systems for setting up connections to the subscriber data terminals, particularly hosts H, and operates using a point-to-point protocol PPP which normally meets the demands on the Internet protocol IP. A subscriber station is authenticated normally using the service RADIUS (Remote Authentication Dial In User Service). In addition, the remote access server RAS generally has modem banks for network-end and subscriber-end data transport and routers for connection to the IP based Internet, known as the IP backbone.

As can be seen from the top left of FIG. 1, a cellular radio telecommunication system or network GSM has subscriber devices MS which communicate with a base transceiver station BTS via a radio interface V. The subscriber stations are, by way of example, mobile stations MS or other mobile and fixed terminals.

The base transceiver station BTS also provides information channels, such as, inter alia, a control and organization channel (BCCH), a frequency correction channel (FCCH) or a random access channel (RACH).

One or more base transceiver stations BTS are connected to a base station control device BSC in order to control them. The base station control device BSC is in turn connected to a mobile switching center MSC. Mobile switching centers MSC, which are networked to one another within a radio network, usually provide the function of a visitor registration database or visitor location register VLR, which receives the visit registration requests from the mobile stations MS and thus permits the volume of signaling to be decentralized. The visitor files in a visitor location register VLR are in contact with corresponding home location registers HLR, of which every radio telecommunication system contains at least one instantiation which is frequently advantageously likewise provided on the technical platform of a mobile switching center (MSC). The home location registers HLR store subscriber specific data records, e.g. authentication parameters.

In addition, radio communication systems contain special, distinguished mobile switching centers G-MSC which, for speech, for example, allow access to other, heterogeneous networks, e.g. landline networks such as PSTN/ISDN, but also to other radio networks. These distinguished mobile switching centers G-MSC are normally referred to as gateway MSCs (G-MSCs).

Data traffic, particularly Internet data traffic, is supplied directly to the data networks in radio systems, e.g. in GSM networks, advantageously via special network devices, e.g. GSN (GPRS Support Nodes). These network components frequently exist in the executing component SGSN (Serving GSN) and in a network gateway component GGSN (Gateway GSN).

FIG. 1 shows this possible implementation for second generation mobile radio systems (GSM) by way of example. In addition, one possible exemplary embodiment is shown for third generation mobile radio systems (e.g. UMTS). In this context, the usual abbreviations are indicated, that is to say, in comparison with GSM: UE instead of MS, NodeB instead of BTS, . . .

To control and check the radio telecommunication system GSM, the mobile switching center MSC is connected to an operating and maintenance center OMC. In addition, the mobile switching center MSC is connected, as described, to a home location register HLR and to a visitor location register VLR or inherently contains these. The home location register HLR stores subscriber specific data, e.g. the last known location or the current location of the subscriber station MS and its entitlement to use particular services. The visitor location register VLR also manages data for subscriber stations MS which communicate with the network but can be attributed to another network operator.

The developments described below can also be transferred to other radio telecommunication systems, for example to the UMTS.

As can be seen from the right side of FIG. 1, a local area data network LAN, e.g. a local radio network WLAN, has stations which are referred to below as hosts H. A typical example of such a data network (W-)LAN is an Ethernet within a company. In this network, the individual stations or hosts H are connected to one another directly or by bridges and hubs. In this case, a hub can essentially be regarded as a distributor device to which a plurality of data end stations H can be connected at the same time and are then supplied with all the data. A bridge is essentially comparable to a hub, but also provides an opportunity to segment or distribute the data passing through.

Besides hard-wired connections in a data network LAN, radio data networks WLAN (Wired Local Area Network) also contain connections via radio interfaces VL. For such radio connections, it is possible to use, inter alia, the "Bluetooth radio access protocol" (Bluetooth Radio AP). This is a very simple protocol which supports just one point-to-point connection between two devices which are currently communicating with one another. It thus has a much simpler structure than the protocols which are used for cellular radio systems.

Such systems primarily use an air interface based on the IEEE 802.11 standard.

Such a data network (W-)LAN can also have one or more service servers, particularly with subsequently described logic devices, e.g. a domain name server DNS. Alternatively, some of these devices can be held in other or in independent devices, where they can be split and/or set up as client and server parts (client part/server part).

An HTTP server allows the subscriber to access his selected Internet pages "with the click of a mouse" without needing to know the specific IP addresses of the respective providers.

Using a dynamic host configuration protocol DHCP or a "DHCP server", connection of a host H to the data network (W-)LAN involves allocation of an address, particularly an IP address, at which the newly added host H can be clearly identified and addressed in the network. Usually, address allocation takes place on a variable basis, which means that the address space available internationally for all hosts H to a limited extent only is not exhausted. Advantageously, the DHCP server can allocate IP addresses with a time limit, so that a host H has to request a new IP address after a stipulated time has elapsed.

In addition, the access server AS can have an authentication and authorization server (AA server) which can also, optionally as an accounting server (AAA server), permit central billing of charges incurred (AAA server).

Other server devices can be used for connection to networks such as the Internet, for example "POP3 servers" and/or "SMTP servers" (SMPT: Simple Mail Transfer Protocol), which are used for interchanging electronic mail (e-mail).

In the exemplary embodiments explained in more detail below, a respective simple modification and/or addition to, preferably, just a single respective station SSG is made in one of the systems, i.e. in the actual data network (W-)LAN and/or in the actual telecommunication network GSM/UMTS, so that, in particular, technical changes to the design of the subscriber stations MS or data terminals H in the respective networks can be avoided.

Ideally, the introduction of a device subsequently referred to as a service selection gateway SSG suffices in a data network (W-)LAN, where necessary functions can be controlled by using the inherently known simple network management protocol SNMP.

Figure 2:
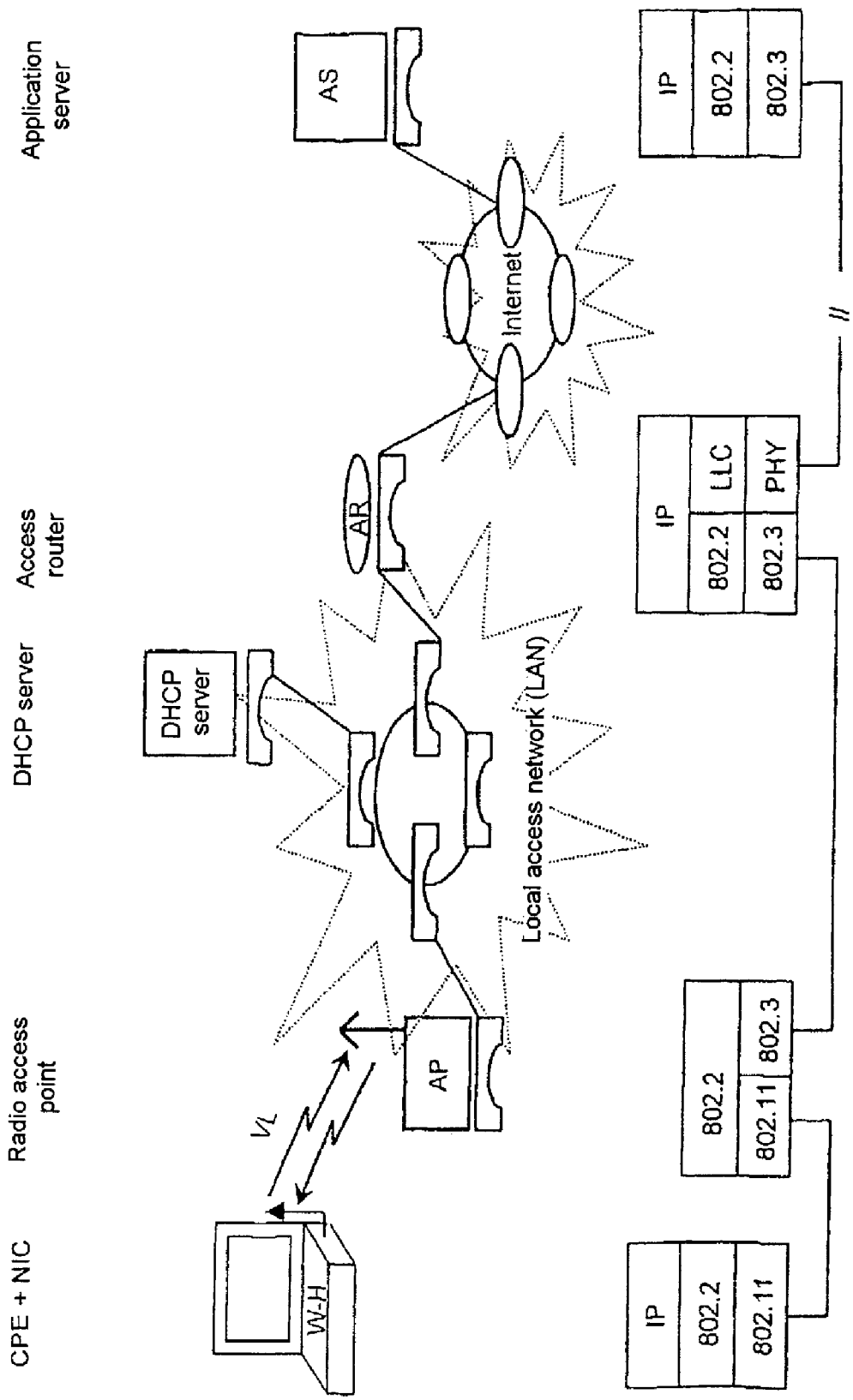
FIG. 2 shows a schematic design for a network with a tabular overview of protocol functions in individual devices.

As can be seen from FIG. 2, most of the elements in the system can be used unaltered, although a large number of standard devices are provided with the opportunity to access, by way of example, the database in a home location register HLR which is available in a mobile radio network GSM or at a remote server location in another data network (W-)LAN. To some extent, the devices described below also have components/functions of a service selection gateway SSG, however.

Thus, a commercially available standard host W-H with a central processing device CPE and a network interface card NIC can continue to communicate with a commercially available bridge via a radio interface VL. In this case, existing protocols for DHCP access can be used, e.g. 802.11 or a HiperLAN radio access protocol. The bridge forms, in the usual way, the interface between, by way of example, the protocols for data network radio interfaces (802.11) and data network cable interfaces (802.3).

In addition, known radio stations which support point-to-point connections to other devices, e.g. to a data terminal H with a radio interface, as an alternative radio technology can be used in the system. A standard protocol which is normal in this regard is the "Bluetooth radio access protocol".

In the case of a point-to-point connection used for radio access, one or more servers (access servers) which terminate the logical point-to-point connection at the network end are advantageously provided in the network.

Such a local radio access network (WLAN) can allow subscribers wireless data access, e.g. for using Internet services. In the case of unauthenticated subscriber access for which no charge is made, it is sufficient to provide an arrangement as shown in FIG. 2.

A subscriber terminal W-H wirelessly connected to a local area network (W-)LAN can use an air interface VL (IEEE 802.11) to contact a radio access point AP which is advantageously implemented in the form of a bridge (LAN bridge) in the network topology. The access identity required for this data session, e.g. an IP address, is dynamically assigned by a DHCP server. In the subscriber terminal W-H, the DHCP server also configures, inter alia, the address, e.g. the IP address, of an access router AR for the IP transport network. FIG. 2 also shows an example of the protocol layers normally used, in the example on the basis of the well known IEEE 802.11 standard.

Figure 3:
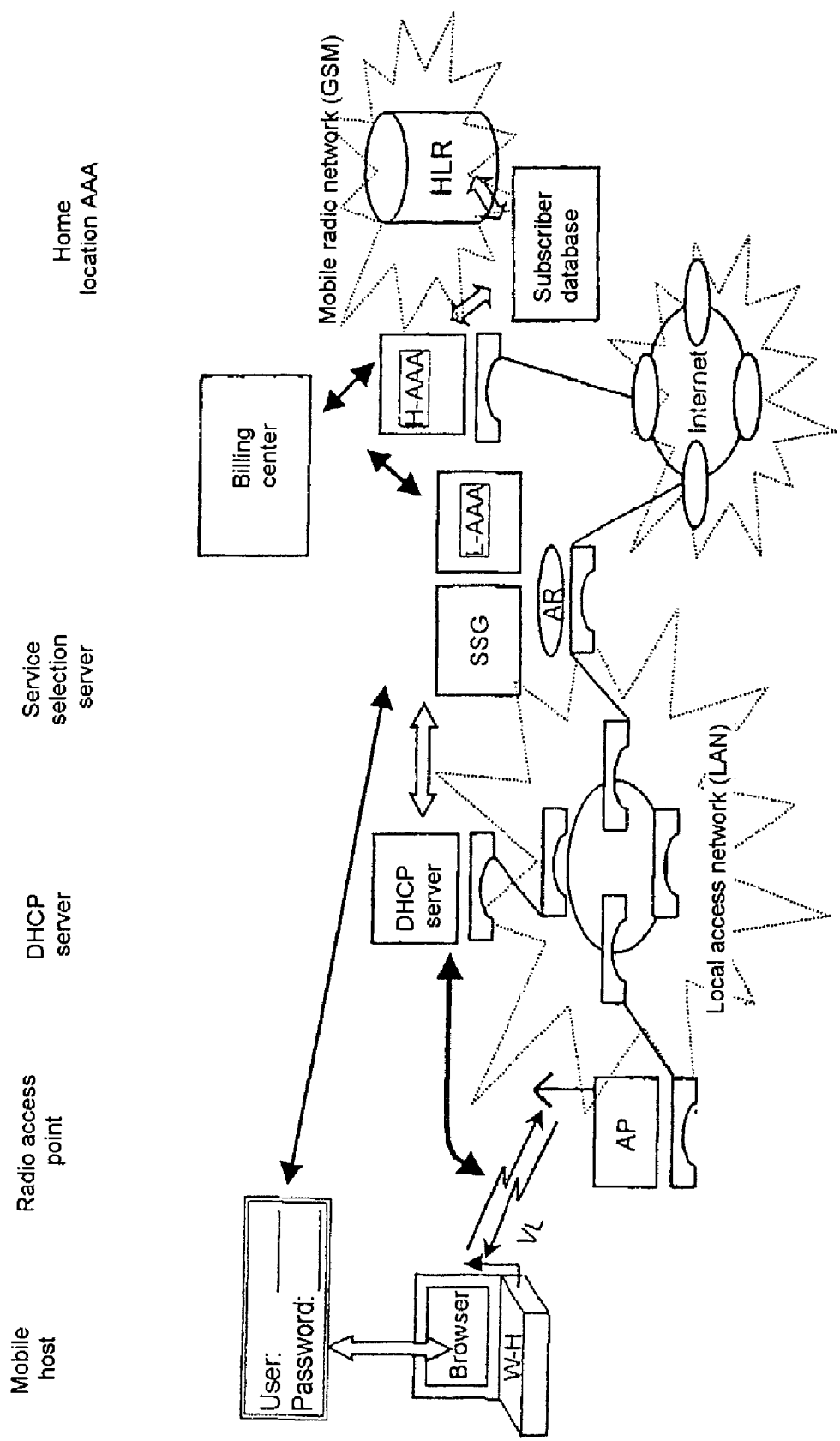
FIG. 3 shows a first specific exemplary embodiment.

A particularly advantageous aspect of the exemplary embodiment shown in FIG. 3 involves using simple methodology to provide added features which, beyond this toll-free unauthenticated data access, allow operators of scattered local area data networks (W-)LAN and operators of second networks GSM using local area networks (W-)LAN authenticatable and chargeable wireless subscriber access using the local area network or using means in the second network.

In line with the method described above, a subscriber accesses a radio access point AP wirelessly and is then assigned a temporary identity, e.g. an IP address, by a DHCP server. Normally, subscribers use a special piece of Internet or network access software called a browser and use "mouse clicking" or manual input on a keyboard to choose an Internet page referenced by a universal data source indicator in text form URL (Universal Resource Locator). The network access software is able to dial up or address a particular service server or service selection server SSG, particularly an HTTP server, whose IP address has been given to the subscriber terminal W-H by the DHCP server. The address of the service server SSG is advantageously equivalent to the IP address of the service selection server SSG. This HTTP server is able to evaluate the desired URL and to display the Internet page desired by the subscriber. Similarly, the service selection server SSG itself can generate Internet pages and can display them on the subscriber terminal.

The service selection server SSG advantageously manages a reference table storing the respective authentication state on the basis of the sometimes temporary subscriber identity or subscriber terminal identity, e.g. the IP address. The service selection server SSG can display an Internet page, particularly an HTTP page, with an authentication request (name, password) to unauthorized subscribers on the subscriber terminal W-H using the network access software which is available thereon.

The subscriber identification data (name, password) obtained from the subscriber or subscriber terminal W-H can now be verified by the data selection server SSG by either accessing locally available subscriber data records (AAA server) or subscriber data records in other local networks (AAA client) or subscriber data records in second, heterogeneous networks GSM, UMTS, PSTN.

To this end, methods for coupling local area networks (W-)LAN to heterogeneous, second networks GSM, UMTS, . . . are expediently provided in order to be able to allow such described authentication and billing operations.

By way of example, subscriber specific data records for subscribers wishing to use services in the local area network are held in a second network GSM. The service access server SSG has a local AAA functionality L-AAA which can access a database for the purpose of authenticating and billing for services. This database is also used for the home location register HLR in a second network GSM for the purpose of authenticating and billing for services in the second network.

Advantageously, the home location register HLR together with the common database for subscriber specific data records for authenticating and billing in a local area network (W-)LAN and a second network GSM even has an AAA server functionality with regard to the local area network (W-)LAN for database access to subscriber specific data records for authenticating and billing for services in the local area network (W-)LAN.

A subscriber can thus have a subscription in the local area network (W-)LAN and in the second network GSM, UMTS. The subscriber specific data records, needed for authenticating and billing, for using services in the local area network (W-)LAN or second network GSM can continue to be held only at a central point as well, e.g. in the home location database or in the home location register HLR in the second network GSM, for example.

The HLR's AAA server can process billing related data received from the local area network (W-)LAN in line with the methods customary in the second network and can send them to a billing center in the second network, e.g. using the RADIUS protocol.

The home location register HLR in the telecommunication network GSM thus presents itself to the local area network (W-)LAN, using the existing standard as a result of these extensions, as an AAA component which is typical for data networks, particularly local area data networks.

Figure 4:
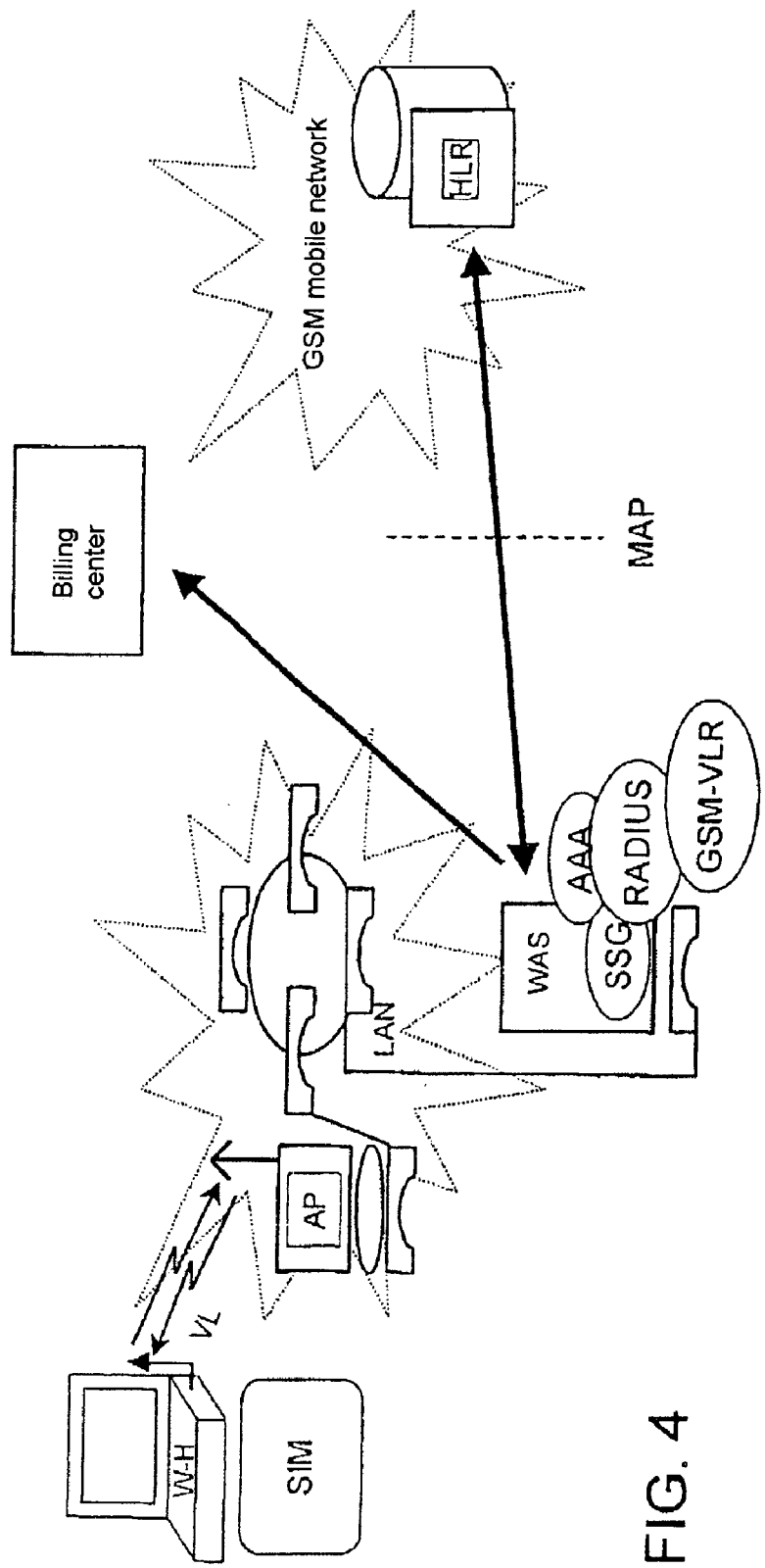
FIG. 4 shows a second specific exemplary embodiment.

Another method is presented by the exemplary embodiment described with reference to FIG. 4. FIG. 4 shows wireless subscriber access to a local area network W-LAN as described above. Unlike in the exemplary embodiment above, in this case the local area network W-LAN itself provides a functionality in the form of a radio access support server WAS (Wireless Access Server), which, besides the described functionality of a service selection gateway or service selection server SSG and other service-supporting functions (DNS, HTTP), provides those visitor location register (VLR) functions of a second network which are necessary for requesting and receiving authentication related and billing related, subscriber specific data from the home location register HLR in the second network GSM, UMTS. Consequently, the radio access support server WAS makes these data available in the local area network (W-)LAN on interface protocols, e.g. RADIUS, which are normally used in the local area network (W-)LAN.

The connection control between the radio access support server WAS and the home location register HLR is advantageously provided using the MAP protocol (Mobile Application Part), which is known per se. Thus a connection device in a first network is mapped to a second network, as a generic part of the second network. Reciprocal interoperability is provided through this mapping.

The subscriber-end data terminal (host) advantageously has a SIM card reader (SIM: Subscriber Identification Module) and can handle the authentication requests sent to it in the manner of the second network GSM. The SIM card reader can therefore be used to read the identity information on the SIM card, e.g. for a subscriber registered in the second network GSM, UMTS or for a subscriber station MS registered therein.

Alternatively, by way of example, a portable computer (notebook) can use an infrared interface with a subscriber station MS in the second network GSM communicating, to send a request and to read out the required response values advantageously in the same way.

Figure 5:
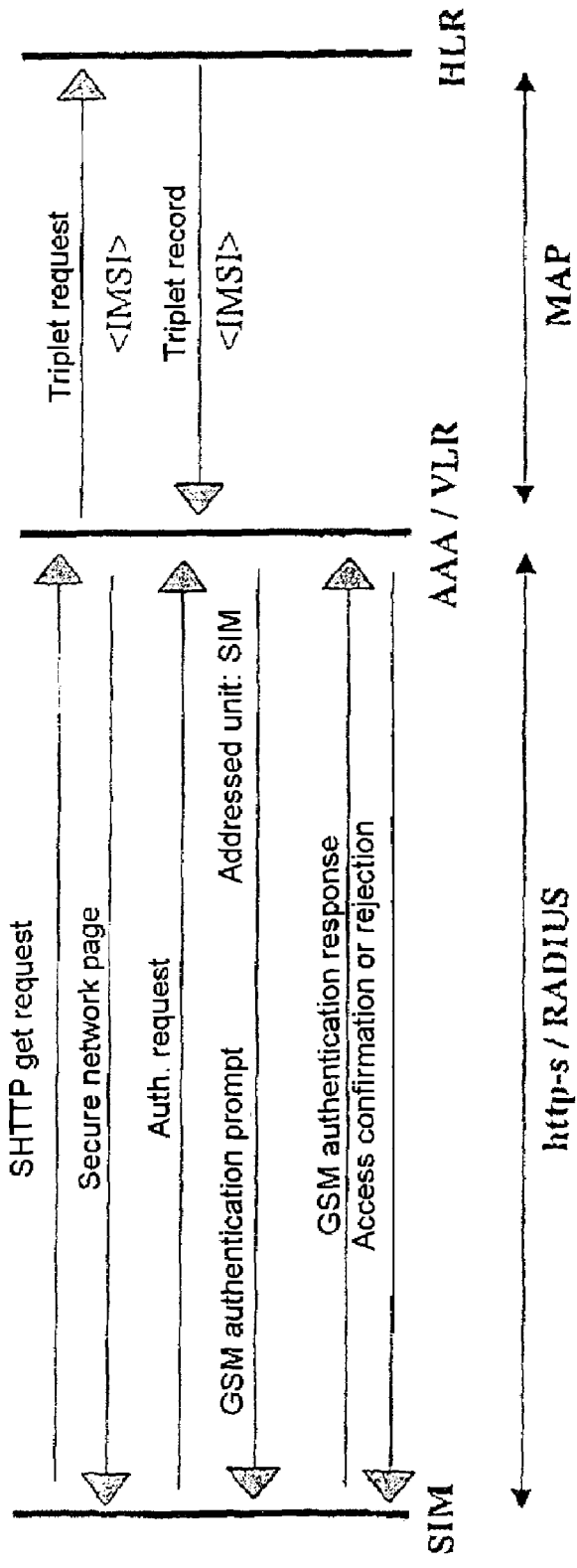
FIG. 5 shows an illustrative method sequence for authenticating a host in a data network using data in another network, particularly one which uses a different technology.

FIG. 5 shows one possible, currently typical, flow of messages for authentication, specifically based, by way of example, on the GSM standard and on a typical HTTP dialog.

When an Internet page is dialed up, the subscriber's access software (browser) sends a request for setting up a secure Internet page dialog using the known HTTP (Hyper Text Transmission Protocol) to the HTTP server, which can be in the form of part of a service selection gateway SSG.

On the basis of this request, the server then sets up a secure HTTP dialog and displays a secure Internet page on the host.

At the same time, the server requests a data record (triplets) from the GSM home database HLR, specifically with reference to the subscriber identity used in the host (IMSI, International Mobile Subscriber Identity). As soon as the requested authentication parameters have been obtained by the server, the secure HTTP connection (SHTTP) can be used to produce an authentication prompt in line with GSM (challenge/response) using SIM (Subscriber Identification Module) functionalities. To increase security of access still further, the host can optionally prompt authentication of the network itself. The network can send the host the response to the network authentication request together with the authentication request. Depending on the result of authentication, the server and/or the host can permit or prohibit further data access.

The radio access support server WAS can process billing related data generated in the local area network (W-)LAN in line with the methods which are customary in the second network and/or can send them directly to a billing center in the second network, e.g. using RADIUS.

As a result of these extensions, the local area network (W-)LAN presents itself to the second network GSM, UMTS, . . . as a network component which is known to the second network GSM, e.g. as a visitor location register VLR.

The invention has been described in detail with particular reference to preferred embodiments thereof and examples, but it will be understood that variations and modifications can be effected within the spirit and scope of the invention.

The invention claimed is:

1. A method for performing data interchange between a first network, which is based on a first technology, and a second network, which is based on a second technology, comprising:
    setting up communication between a station and the first network, using the first technology, and basic functions of the first network;
    performing authentication and/or authorization of the station at a first server providing Authentication, Authorization and Accounting (AAA) functionality located in the first network, the first server in the first network authenticating and/or authorizing the station to use services in the first network wherein data specific to the station or specific to a subscriber using the station used for performing the authentication and/or authorization are obtained from a data source external to the first network, and the subscriber using the station has a subscription in the first network and a subscription in the second network;
    providing the station with billing functions, the billing functions being provided by the first server in the first network, the billing functions being specific to the second network; and
    transferring billing related data specific to the subscriber between the first server in the first network and a second server providing AAA functionality located in the second network, wherein
    the second server in the second network processes the billing related data specific to the subscriber in line with methods customary in the second network,
    the station is authenticated through a Subscriber Identity Module (SIM) card reader associated with the second network or though a subscriber station associated with the second network but located in the region of the station in the first network, and
    the first network is a local network and the second network is a cellular mobile radio network.

2. The method as claimed in claim 1, further comprising:
    mapping a connection device in the first network to the second network, as a generic part of the second network; and
    providing reciprocal interoperability by mapping the connection device.

3. The method as claimed in claim 1, wherein the first network is connected to the second network by a typical interface dedicated to the second network.

4. The method as claimed in claim 1, wherein the first network takes on the function of a visitor location register in the second network.

5. The method as claimed in claim 1, wherein
the first network is connected to the second network through a switching interface, and
the first network uses a connection server to convert functions and messages from the switching interface into specific functions and messages in the first network.

6. The method as claimed in claim 5, wherein the connection server has at least one of a Remote Authentication Dial In User Service and a service intermittent proxy functionality.

7. The method as claimed in claim 1, wherein
the second network is a cellular mobile radio network having a home location database, and
the first network uses a connection server to access the home location database in the second network.

8. The method as claimed in claim 1, wherein
the second network has a home location register, and
the first network communicates authentication related subscriber information with the second network via the home location register of the second network.

9. The method as claimed in claim 1, wherein the first network has a connection server with Hyper Text Transmission Protocol functionality.

10. The method as claimed in claim 1, wherein
the first network and the station communicate with one another via an air interface, and
the air interface is encrypted using authentication parameters obtained from the second network.

11. The method as claimed in claim 1, wherein data and functions required to authenticate the station are obtained through a Subscriber Identification Module card associated with the second network.

12. The method as claimed in claim 11, wherein
for authentication purposes, an identity information from the SIM card reader or the subscriber station is transmitted via the first network to a visitor device which is associated with the first network and has a visitor location register functionality of the second network,
based on the identity information, the visitor device transmits a request for authentication parameters to the second network,
the second network transmits data relating to the identity information to the first network for authentication purposes, and
depending on the data relating to the identity information, the station is permitted or refused data access in the first network.

13. The method as claimed in claim 1, wherein
the data source is a home location database provided in the second network, and
the home location database stores subscriber data records in a typical structure of the first network.

14. The method as claimed in claim 1, wherein the subscriber data records in the typical structure of the first network are linked on a subscriber specific basis to data records with a typical structure of the second network.

15. The method as claimed in claim 1, wherein authentication related data are interchanged between the station communicating through the first network and a subscriber terminal in the second network.

16. The method as claimed in claim 15, wherein
the station communicating through the first network is a subscriber terminal located in the first network, and
the subscriber terminal located in the first network transmits authentication challenges to the subscriber terminal in the second network and receives corresponding response values from the subscriber terminal in the second network.

17. The method as claimed in claim 1, wherein the station is a mobile subscriber.

18. The method as claimed in claim 1, wherein the station is a mobile data terminal.

19. The method as claimed in claim 2, wherein the first network is connected to the second network by a typical interface dedicated to the second network.

20. The method as claimed in claim 19, wherein the first network takes on the function of a visitor location register in the second network.

21. The method as claimed in claim 20, wherein
the first network is connected to the second network through a switching interface, and
the first network uses a connection server to convert functions and messages from the switching interface into specific functions and messages in the first network.

22. The method as claimed in claim 21, wherein the connection server has at least one of a Remote Authentication Dial In User Service and a service intermittent proxy functionality.

23. The method as claimed in claim 22, wherein
the second network is a cellular mobile radio network having a home location database, and
the first network uses a connection server to access the home location database in the second network.

24. The method as claimed in claim 23, wherein
the second network has a home location register, and
the first network communicates authentication related subscriber information with the second network via the home location register of the second network.

25. The method as claimed in claim 24, wherein the first network has a connection server with Hyper Text Transmission Protocol functionality.

26. The method as claimed in claim 25, wherein
the first network and the station communicate with one another via an air interface, and
the air interface is encrypted using authentication parameters obtained from the second network.

27. The method as claimed in claim 26, wherein data and functions required to authenticate the station are obtained through a Subscriber Identification Module card associated with the second network.

28. The method as claimed in claim 27, wherein
for authentication purposes, a visitor device is associated with the first network in the second network,
the visitor device transmits identity information and a request for authentication parameters to the second network,
the second network transmits data relating to the identity information, to the first network for authentication purposes, and
depending on the data relating to the identity information, the station is permitted or refused data access in the first network.

29. The method, as claimed in claim 28, wherein data specific to the station or specific to a subscriber using the station are obtained from a data source external to the first network.

30. A network device for a first network based on a first technology, comprising:
an interface to set up communication with a station using the first technology and basic functions associated with the first network; and
a first server providing Authentication, Authorization and Accounting (AAA) functionality located in the first network to authenticate and/or authorize the station to use services in the first network, wherein authentication and/or authorization data specific to the station or specific to a subscriber using the station are obtained from a data source external to the first network, the subscriber using the station has a subscription in the first network and a subscription in a second network, the second network being based on a second technology, the second technology being different from the first technology, the first server in the first network provides the station with billing functions, the billing functions being specific to the second network, billing related data specific to the subscriber is transferred between the first server in the first network and a second server providing AAA functionality located in the second network, the second server in the second network processes the billing related data specific to the subscriber in line with methods customary in the second network, the station is authenticated through a Subscriber Identity Module (SIM) card reader associated with the second network or though a subscriber station associated with the second network but located in the region of the station in the first network, and the first network is a local network and the second network is a cellular mobile radio network.

31. The method as claimed in claim 1, wherein subscriber specific authentication data is stored in the second network.

32. The method according to claim 1, wherein to perform authentication, the first server located in the first network requests a data record from the second network, the first network provides the station with a requested access before the data record is returned from the second network, and after the data record is returned, the first server in the first network determines whether to continue providing the requested access, based on a content of the data record.

33. A method for performing data interchange between a first network, which is based on a first technology, and a second network, which is based on a second technology, comprising:

setting up communication between a station and the first network, using the first technology, and basic functions of the first network;

performing authentication and/or authorization of the station at a first server providing Authentication, Authorization and Accounting (AAA) functionality located in the first network, the first server in the first network authenticating and/or authorizing the station to use services in the first network wherein data specific to the station or specific to a subscriber using the station used for performing the authentication and/or authorization are obtained from a data source external to the first network, and the subscriber using the station has a subscription in the first network and a subscription in the second network;

providing the station with billing functions, the billing functions being provided by the first server in the first network, the billing functions being specific to the second network; and transferring billing related data specific to the subscriber between the first server in the first network and a second server providing AAA functionality located in the second network, wherein the second server in the second network processes the billing related data specific to the subscriber in line with methods that are customary in the second network, the first network is a Wireless Local Area Network (WLAN) network and the second network is a cellular mobile radio network, and the station is authenticated through a Subscriber Identity Module (SIM) card reader associated with the second network or though a subscriber station associated with the second network but located in the region of the station in the first network.

* * * * *